US012213526B2

(12) United States Patent
Schneider et al.

(10) Patent No.: US 12,213,526 B2
(45) **Date of Patent: *Feb. 4, 2025**

(54) HEATING ASSEMBLY FOR AN AEROSOL GENERATING SYSTEM

(71) Applicant: Philip Morris Products S.A., Neuchatel (CH)

(72) Inventors: Jean-Claude Schneider, Auvernier (CH); Julien Plojoux, Geneva (CH); Felix Fernando, Wokingham (GB); Olivier Greim, Villars-Burquin (CH)

(73) Assignee: Philip Morris Products S.A., Neuchatel (CH)

( * ) Notice: Subject to any disclaimer, the term of this patent is extended or adjusted under 35 U.S.C. 154(b) by 689 days.

This patent is subject to a terminal disclaimer.

(21) Appl. No.: 17/018,652

(22) Filed: Sep. 11, 2020

(65) Prior Publication Data

US 2020/0413495 A1 Dec. 31, 2020

Related U.S. Application Data

(60) Continuation of application No. 15/442,156, filed on Feb. 24, 2017, now Pat. No. 10,813,174, which is a
(Continued)

(30) Foreign Application Priority Data

Dec. 28, 2012 (EP) .................................... 12275223

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/70* (2020.01); *H05B 1/0244* (2013.01);
(Continued)

(58) Field of Classification Search
None
See application file for complete search history.

(56) References Cited

U.S. PATENT DOCUMENTS 3,312,375 A 4/1967 Williams
3,479,143 A 11/1969 Kelsall
(Continued)

FOREIGN PATENT DOCUMENTS

EA 012883 B1 12/2009
EP 0 430 559 A2 6/1991
(Continued)

OTHER PUBLICATIONS

U.S. Appl. No. 15/442,156, filed Feb. 24, 2017, US 2017/0164659 A1, Jean-Claude Schneider, et al.
(Continued)

*Primary Examiner* — Phu H Nguyen
(74) *Attorney, Agent, or Firm* — Oblon, McClelland, Maier & Neustadt, L.L.P.

(57) ABSTRACT

An aerosol-generating smoking device, is provided, including: a heater configured to heat an aerosol-forming substrate, the heater including an electrically resistive heating element and a heater substrate, the electrically resistive heating element including a first portion formed from a first material and a second portion formed from a second material different than the first material, configured such that, when an electrical current is passed through the electrically resistive heating element, the first portion is heated to a higher temperature than the second portion as a result of the electrical current.

15 Claims, 3 Drawing Sheets

Related U.S. Application Data division of application No. 14/414,791, filed as application No. PCT/EP2013/076970 on Dec. 17, 2013, now Pat. No. 9,674,894.

(51) Int. Cl.

| | |
|---|---|
| ***A24F 40/70*** | (2020.01) |
| ***H05B 1/02*** | (2006.01) |
| ***H05B 3/00*** | (2006.01) |

(52) U.S. Cl.

CPC ............ *H05B 3/0014* (2013.01); *A24F 40/20* (2020.01); *H05B 2203/021* (2013.01); *Y10T 29/49083* (2015.01)

(56) References Cited

U.S. PATENT DOCUMENTS

| | | | | |
|---|---|---|---|---|
| 3,875,476 | A | 4/1975 | Crandall et al. | |
| 3,964,943 | A | 6/1976 | Andersen | |
| 4,241,292 | A | 12/1980 | Kreick | |
| 4,547,656 | A | 10/1985 | Swiatosz et al. | |
| 5,224,498 | A * | 7/1993 | Deevi | A24F 40/46 131/194 |
| 5,322,075 | A | 6/1994 | Deevi et al. | |
| 5,353,813 | A | 10/1994 | Deevi et al. | |
| 5,362,944 | A | 11/1994 | Hatanaka et al. | |
| 5,530,225 | A * | 6/1996 | Hajaligol | A24F 40/46 131/194 |
| 5,573,692 | A | 11/1996 | Das et al. | |
| 5,591,368 | A | 1/1997 | Fleischhauer | |
| 5,706,389 | A | 1/1998 | Pöhler | |
| 6,184,497 | B1 | 2/2001 | Leigh | |
| 6,501,052 | B2 | 12/2002 | Cox et al. | |
| 6,632,047 | B2 | 10/2003 | Vinegar et al. | |
| 6,681,769 | B2 | 1/2004 | Sprinkel, Jr. et al. | |
| 7,004,678 | B2 | 2/2006 | Stegemeier et al. | |
| 7,173,222 | B2 | 2/2007 | Cox et al. | |
| 7,880,123 | B2 | 2/2011 | Kim et al. | |
| 2005/0172976 | A1 | 8/2005 | Newman et al. | |
| 2007/0221647 | A1 | 9/2007 | Walker et al. | |
| 2011/0155151 | A1 | 6/2011 | Newman et al. | |
| 2011/0155718 | A1 | 6/2011 | Greim et al. | |
| 2011/0290269 | A1 | 12/2011 | Shimizu | |
| 2014/0064715 | A1 | 3/2014 | Greim et al. | |

FOREIGN PATENT DOCUMENTS

| | | | |
|---|---|---|---|
| EP | 0 822 760 | B1 | 6/2003 |
| EP | 1600066 | A2 | 11/2005 |
| EP | 2 110 033 | A1 | 10/2009 |
| EP | 2 340 730 | | 7/2011 |
| EP | 2 394 520 | | 12/2011 |
| EP | 1993388 | B1 | 8/2012 |
| EP | 2 882 308 | B1 | 9/2016 |
| GB | 2 473 264 | | 3/2011 |
| JP | 2011-135901 | A | 7/2011 |
| KR | 10-2000-0011970 | A | 2/2000 |
| KR | 10-0413783 | B1 | 12/2003 |
| KR | 10-0449444 | B1 | 8/2005 |
| KR | 10-0636287 | B1 | 10/2006 |
| KR | 10-2010-0061083 | A | 6/2010 |
| KR | 10-1281269 | B1 | 7/2013 |
| RU | 2 132 629 | C1 | 7/1999 |
| RU | 76781 | U1 | 10/2008 |
| TW | 318780 | | 5/1985 |
| WO | 96/32854 | A2 | 10/1996 |
| WO | 2011/050964 | A1 | 5/2011 |
| WO | 2011/076407 | A1 | 6/2011 |
| WO | WO2011/063970 | | 6/2011 |
| WO | WO2012/065310 | | 5/2012 |
| WO | 03/037412 | A2 | 5/2013 |
| WO | 2013/098395 | A1 | 7/2013 |
| WO | 2013/116558 | A1 | 8/2013 |
| WO | 2014/102092 | A1 | 7/2014 |

OTHER PUBLICATIONS

U.S. Pat. No. 9,674,894, filed Jan. 14, 2015, US 2015/0163859 A1, Jean-Claude Schneider, et al.

Extended European Search Report in English issued in EP 16 17 9347 on Nov. 25, 2016, (6 pages).

Office Action issued May 29, 2018 in Korean Patent Application No. 10-2016-7026500 (submitting English language translation only).

English language translation only of Office Action issued Nov. 13, 2017 in Korean Patent Application No. 10-2016-7026500, 6 pages.

Combined Taiwanese Office Action and Search Report issued Jul. 25, 2017 in Taiwanese Patent Application No. 102147080.

Written Opinion of the International Searching Authority Issued May 14, 2014 in PCT/EP13/076970 Filed Dec. 17, 2013.

International Search Report Issued May 14, 2014 in PCT/EP13/076970 Filed Dec. 17, 2013.

Office Action issued Jul. 22, 2015 in Japanese Patent Application No. 2015-522126 (submitting English translation only).

Korean Office Action (English translation) dated Apr. 23, 2016 in corresponding Korean Application No. 10-2015-7022087, (3 pages).

Translation of Decision to Grant mailed on Sep. 15, 2016 in corresponding Russian application No. 2015131116, (5 pages).

Russian Decision to Grant a Patent for Invention and Search Report mailed on Jul. 10, 2023 issued in Russian Patent Application No. 2020113357 filed on Apr. 13, 2020, with English Translation, total 20 pages.

Korean Office Action mailed on Jul. 26, 2023 issued in South Korean Patent Application No. 2022-7013893 filed on Dec. 17, 2013, with English Translation, total 10 pages.

* cited by examiner

HEATING ASSEMBLY FOR AN AEROSOL GENERATING SYSTEM

CROSS-REFERENCE TO RELATED APPLICATIONS

This application is a continuation of and claims the benefit of priority under 35 U.S.C, § 120 from U.S. application Ser. No. 15/,442,156, filed Feb. 24, 2017, which is a divisional application of U.S. application Ser. No. 14/414,791, filed Jan. 14, 2015 (now U.S. Pat. No. 9,674,894), which is a U.S. National Stage Application of PCT/EP2013/076970, filed Dec. 17, 2013, and claims the benefit of priority under 35 U.S.C. § 119 from EP 12275223.1, filed Dec. 28, 2012, the entire contents of each of which are incorporated herein by reference.

FIELD

The specification relates to a heating assembly suitable for use in an aerosol-generating system. In particular the invention relates to a heating assembly suitable for insertion into an aerosol-forming substrate of a smoking article in order to internally heat the aerosol-forming substrate.

BACKGROUND

There is increasing demand for handheld aerosol-generating devices that are able to deliver aerosol for user inhalation. One particular area of demand is for heated smoking devices in which an aerosol-forming substrate is heated to release volatile flavour compounds, without combustion of the aerosol-forming substrate. The released volatile compounds are conveyed within an aerosol to the user.

Any aerosol-generating device that operates by heating an aerosol-forming substrate must include a heating assembly. A number of different types of heating assembly have been proposed for different types of aerosol-forming substrate.

One type of heating assembly that has been proposed for heated smoking devices operates by inserting a heater into a solid aerosol-forming substrate, such as a plug of tobacco. This arrangement allows the substrate to be heated directly and efficiently. But there are number of technical challenges with this type of heating assembly, including meeting requirements for small size, robustness, low manufacturing cost, sufficient operating temperatures and effective localisation of generated heat.

It would be desirable to provide a robust, inexpensive heating assembly for an aerosol-generating device that provides a localised source of heat for heating an aerosol-forming substrate.

SUMMARY

In a first aspect of the invention, there is provided a heating assembly for heating an aerosol-forming substrate, the heating assembly comprising:

a heater comprising an electrically resistive heating element and a heater substrate; and a heater mount coupled to the heater;

wherein the heating element comprises a first portion and a second portion configured such that, when an electrical current is passed through the heating element the first portion is heated to a higher temperature than the second portion, wherein the first portion of the heating element is positioned on a heating area of the heater substrate and the second portion of the heating element is positioned on a holding area of the heater substrate; and wherein the heater mount is fixed to the holding area of the heater substrate.

As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article.

As used herein, the terms 'aerosol-generating article' and 'smoking article' refer to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable. A smoking article comprising an aerosol-forming substrate comprising tobacco is referred to as a tobacco stick.

The first portion is heated to a higher temperature than the second portion as a result of the electrical current passing through the heating element. In one embodiment, the first portion of the heating element is configured to reach a temperature of between about 300° C. and about 550° C. in use. Preferably, the heating element is configured to reach a temperature of between about 320° C. and about 350° C.

The heater mount provides structural support to the heater and allows it to be securely fixed within an aerosol-generating device. The heater mount may comprise a polymeric material and advantageously is formed from a mouldable polymeric material, such as polyether ether ketone (PEEK). The use of a mouldable polymer allows the heater mount to be moulded around the heater and thereby firmly hold the heater. It also allows the heater mount to be produced with a desired external shape and dimensions in an inexpensive manner. The heater substrate may have mechanical features, such as lugs or notches, which enhance the fixing of the heater mount to the heater. It is of course possible to use other materials for the heater mount, such as a ceramic material. Advantageously, the heater mount may be formed from a mouldable ceramic material.

The use of a polymer to hold the heater means that the temperature of the heater in the vicinity of the heater mount must be controlled to be below the temperature at which the polymer will melt burn or otherwise degrade, At the same time the temperature of the portion of the heater within the aerosol-forming substrate must be sufficient to produce an aerosol with the desired properties. It is therefore desirable to ensure that the second portion of the heating element, at least at those points in contact with the heater mount, remain below a maximum allowable temperature during use.

In an electrically resistive heater, the heat produced by the heater is dependent on the resistance of the heating element. For a given current, the higher the resistance of the heating element the more heat is produced. It is desirable that most of the heat produced is produced by the first portion of the heating element. Accordingly it is desirable that the first portion of the heating element has a greater electrical resistance per unit length than the second portion of the heater element.

Advantageously, the heating element comprises portions formed from different materials. The first portion of the heating element may be formed from a first material and the second portion of the heating element may be formed from a second material, wherein the first material has a greater electrical resistivity coefficient than the second material. For example, the first material may be Ni—Cr (Nickel-Chromium), platinum, tungsten or alloy wire and the second material may be gold or silver or copper. The dimensions of the first and second portions of the heater element may also differ to provide for a lower electrical resistance per unit length in the second portion.

The materials for the first and second portions of the heating element may be selected for their thermal properties as well as their electrical properties. Advantageously, the second portion of the heating element has a low thermal conductivity, in order to reduce conduction of heat from the heating area to the heater mount. Accordingly, the choice of material for the second portion of the heating element may be a balance between high electrical conductivity and low thermal conductivity, at least in the region between the first portion of the heating element and the heater mount. In practice, gold has been found to be a good choice of material for the second portion of the heating element. Alternatively, silver may comprise the second portion material.

Advantageously, the second portion of the heating element comprises two sections, each of the two sections being separately connected to the first portion of the heating element to define an electrical flow path from the one section of the second portion to the first portion and then to the other section of the second portion. The heater mount may surround both sections of the second portion. It is of course possible for the second portion to comprise more than two portions, each electrically connected to the first portion.

The heating element may comprise a third portion configured for electrical connection to power supply, wherein the third portion is positioned on an opposite side of the heater mount to the first portion of the heating element. The third portion may be formed from a different material to the first and second portions, and may be chosen to provide a low electrical resistance and good connection properties, for example, easily solderable, In practice, silver has been found to be a good choice for the third portion. Alternatively, gold may be used as the material for the third portion. The third portion may comprise a plurality of sections, each connected to a section of the second portion of the heating element.

There may be overlap between the different portions of the heating element to ensure a good electrical connection. For example, the first portion and the third portions may partially overlie or underlie the second portion. Furthermore, the heating element may comprise more than three distinct portions.

The heater substrate is advantageously formed from an electrically insulating material and may be a ceramic material such as Zirconia or Alumina. The heater substrate may provide a mechanically stable support for the heating element over a wide range of temperatures and may provide a rigid structure suitable for insertion into an aerosol-forming substrate. The heater substrate may comprise a planar surface on which the heating element is positioned and a tapered end configured to allow for insertion into an aerosol-forming substrate. The heater substrate advantageously has a thermal conductivity of less than or equal to 2 Watts per metre Kelvin.

In one embodiment, the first portion of the heating element is formed from material having a defined relationship between temperature and resistivity. This allows the heater to be used both to the heat the aerosol-forming substrate and to monitor temperature during use. Advantageously, the first portion has a greater temperature coefficient of resistance than the second portion. This ensures that the value of resistance of the heater element predominantly reflects the temperature of the first portion of the heater element. Platinum has been found to be a good choice for the first portion of the heater element.

Advantageously, the first portion of the heating element is spaced from the heater mount. The part of the heater between the first portion of the heating element and the heater mount advantageously has a thermal gradient between a higher temperature at the first portion of the heater element and a lower temperature at the heater mount, The distance between the first portion of the heating element and the heater mount is chosen to ensure a sufficient temperature drop is obtained. But it is also advantageous that the distance is not greater than necessary both in order to reduce the size of the heater assembly and to ensure the heater assembly is as robust as possible. The greater the length of the heater beyond the heater mount, the more prone it is to snapping or bending if dropped or during repeated insertion and withdrawal from solid aerosol-forming substrates.

Advantageously, under normal operating conditions, when the first portion of the heating element is at a temperature of between about 300 and about 550 degrees centigrade at the points of contact with the heater mount the second portion is at a temperature of less than 200 degrees centigrade. "Normal operating conditions" in this context means at standard ambient temperature and pressure, which is a temperature of 298.15 K (25° C., 77° F.) and an absolute pressure of 100 kPa (14,504 psi, 0.986 atm). Normal operating conditions includes the operation of the heater assembly when positioned within a housing of an aerosol-generating device or outside of the housing of an aerosol-generating device.

Advantageously, the heater assembly is configured such that, if the maximum temperature of the first portion is $T_1$, the ambient temperature is $T_0$, and the temperature of the second portion of the heater element in contact with the heater mount is $T_2$, then:

$$(T_1-T_0)/(T_2-T_0)>2.$$

The heating assembly may comprise one or more layers of material covering the heating element. Advantageously a protective layer, formed for example from glass, may be provided over the heating element to prevent oxidation or other corrosion of the heating element. The protective layer may completely cover the heater substrate. The protective layer, or other layers, may also provide for improved thermal distribution over the heater and may make the heater easier to clean. An underlying layer of material, such as glass, may also be provided between the heating element and heater substrate in order to improve thermal distribution over the heater. The underlying layer of material may also be used to improve the process of forming the heating element.

The dimensions of the heater may be chosen to suit the application of the heating assembly, and it should be clear that the width, length and thickness of the heater may be selected independently of one another. In one embodiment the heater is substantially blade shaped and has a tapered end for insertion into an aerosol-forming substrate. The heater may have a length of between about 10 mm and about 30 mm, and advantageously between about 15 and about 25 mm. The surface of the heater on which the heating element is positioned may have a width of between about 2 mm and about 10 mm, and advantageously between about 3 mm and about 6 mm, The heater may have a thickness of between about 0.2 mm and about 0.5 mm and preferably between 0.3 and 0.4 mm. The active heating area of the heater, corresponding to the portion of the heater in which the first portion of the heating element is positioned, may have a length of between 5 mm and 20 mm and advantageously is between 8 mm and 15 mm. The heater mount may contact the heater over a length of between 2 mm and 5 mm and advantageously over a length of about 3 mm. The distance between the heater mount and the first portion of the heating element may be at least 2 mm and advantageously at least 2.5 mm. In a preferred embodiment the distance between the heater mount and the first portion of the heating element is 3 mm.

In a second aspect of the invention, there is provided an aerosol-generating device comprising: a housing, a heating assembly in accordance with the first aspect of the invention, wherein the heater mount is coupled to the housing, an electrical power supply connected to the heating element, and a control element configured to control the supply of power from the power supply to the heating element;

wherein the housing defines a cavity surround the first portion of the heating element, the cavity configured to receive an aerosol-forming article containing an aerosol forming substrate.

As used herein, an ‘aerosol-generating device’ relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the user's mouth. An aerosol-generating device may be a holder.

The heater mount may form a surface closing one end of the cavity.

The device is preferably a portable or handheld device that is comfortable to hold between the fingers of a single hand. The device may be substantially cylindrical in shape and has a length of between 70 and 120 mm. The maximum diameter of the device is preferably between 10 and 20 mm. In one embodiment the device has a polygonal cross section and has a protruding button formed on one face. In this embodiment, the diameter of the device is between 12.7 and 13.65 mm taken from a flat face to an opposing flat face; between 13,4 and 14.2 taken from an edge to an opposing edge (i.e., from the intersection of two faces on one side of the device to a corresponding intersection on the other side), and between 14.2 and 15 mm taken from a top of the button to an opposing bottom flat face.

The device may be an electrically heated smoking device.

The device may include other heaters in addition to the heater assembly according to the first aspect. For example the device may include an external heater positioned around a perimeter of the cavity. An external heater may take any suitable form. For example, an external heater may take the form of one or more flexible heating foils on a dielectric substrate, such as polyimide. The flexible heating foils can be shaped to conform to the perimeter of the cavity. Alternatively, an external heater may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. An external heater may also be formed using a metal having a defined relationship between temperature and resistivity. In such an exemplary device, the metal may be formed as a track between two layers of suitable insulating materials. An external heater formed in this manner may be used to both heat and monitor the temperature of the external heater during operation.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The control element may be a simple switch. Alternatively the control element may be electric circuitry and may comprise one or more microprocessors or microcontrollers.

In a third aspect of the invention, there is provided an aerosol-generating system comprising an aerosol-generating device according to the second aspect of the invention and one or more aerosol-forming articles configured to be received in the cavity of the aerosol-generating device.

The aerosol-forming article may be a smoking article, During operation a smoking article containing the aerosol-forming substrate may be partially contained within the aerosol-generating device.

The smoking article may be substantially cylindrical in shape. The smoking article may be substantially elongate. The smoking article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The smoking article may have a total length between approximately 30 mm and approximately 100 mm. The smoking article may have an external diameter between approximately 5 mm and approximately 12 mm. The smoking article may comprise a filter plug. The filter plug may be located at a downstream end of the smoking article, The filter plug may be a cellulose acetate filter plug. The filter plug is approximately 7 mm in length in one embodiment, but may have a length of between approximately 5 mm to approximately 10 mm.

In one embodiment, the smoking article has a total length of approximately 45 mm. The smoking article may have an external diameter of approximately 7.2 mm. Further, the aerosol-forming substrate may have a length of approximately 10 mm, Alternatively, the aerosol-forming substrate may have a length of approximately 12 mm. Further, the diameter of the aerosol-forming substrate may be between approximately 5 mm and approximately 12 mm. The smoking article may comprise an outer paper wrapper. Further, the smoking article may comprise a separation between the aerosol-forming substrate and the filter plug. The separation may be approximately 18 mm, but may be in the range of approximately 5 mm to approximately 25 mm.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former that facilitates the formation of a dense and stable aerosol. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise combining one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

In a particularly preferred embodiment, the aerosol-forming substrate comprises a gathered crimpled sheet of homogenised tobacco material. As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-forming substrate may comprise a gathered sheet of homogenised tobacco material that is substantially evenly textured over substantially its entire surface. For example, the aerosol-forming substrate may comprise a gathered crimped sheet of homogenised tobacco material comprising a plurality of substantially parallel ridges or corrugations that are substantially evenly spaced-apart across the width of the sheet.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

The aerosol-generating system is a combination of an aerosol-generating device and one or more aerosol-generating articles for use with the device. However, aerosol-generating system may include additional components, such as for example a charging unit for recharging an on-board electric power supply in an electrically operated or electric aerosol-generating device In a fourth aspect of the invention, there is provided a method of manufacturing a heating assembly comprising:

providing a heater substrate;

depositing one or more electrically resistive heating elements on the substrate, each heating element comprising a first portion and a second portion configured such that, when an electrical current is passed through the heating element the first portion is heated to a higher temperature than the second portion as a result of the electrical current, wherein the first portion of the heating element is deposited on a heating area of the heater substrate and the second portion of the heating element is deposited on a holding area of the heater substrate; and moulding a heater mount to the holding area of the heater substrate.

Advantageously, the heater mount is formed by injection moulding. The heater mount may be formed from an injection mouldable polymer, such as PEEK.

Advantageously, the heater substrate is substantially blade shaped. The components of the heating assembly may be as described in reference to the first aspect of the invention.

The step of moulding may comprise moulding the heater mount such that it surrounds the holding area of the substrate. The heater mount may directly overlie the second portion of the heating element.

In a further aspect of the invention, there is provided a heater for heating an aerosol-forming substrate, the heater comprising:

a heater comprising an electrically resistive heating element and a heater substrate;

wherein the heating element comprises a first portion formed from a first material and a second portion formed from a second material different to the first material, configured such that, when an electrical current is passed through the heating element the first portion is heated to a higher temperature than the second portion as a result of the electrical current.

In a still further aspect of the invention, there is provided a heating assembly for heating an aerosol-forming substrate, the heating assembly comprising:

a heater comprising an electrically resistive heating element; and a heater mount coupled to the heater;

wherein the heating element comprises a first portion and a second portion configured such that, when an electrical current is passed through the heating element the first portion is heated to a higher temperature than the second portion as a result of the electrical current; and wherein the heater mount surrounds the second portion of the heating element and is formed from a moulded polymeric material.

Although the disclosure has been described by reference to different aspects, it should be clear that features described in relation to one aspect of the disclosure may be applied to the other aspects of the disclosure. In particular, aspects of the heater, assembly, device system or method in accordance with one aspect of the invention may be applied to any other aspect of the invention. Furthermore, although the disclosure has been by reference to smoking devices, it should be clear that medical inhaler type devices may use the features, apparatuses, and functionalities described herein.

BRIEF DESCRIPTION OF THE DRAWINGS

Embodiments of the invention will now be described in detail, by way of example only, with reference to the accompanying drawings, in which.

DETAILED DESCRIPTION

Figure 1:
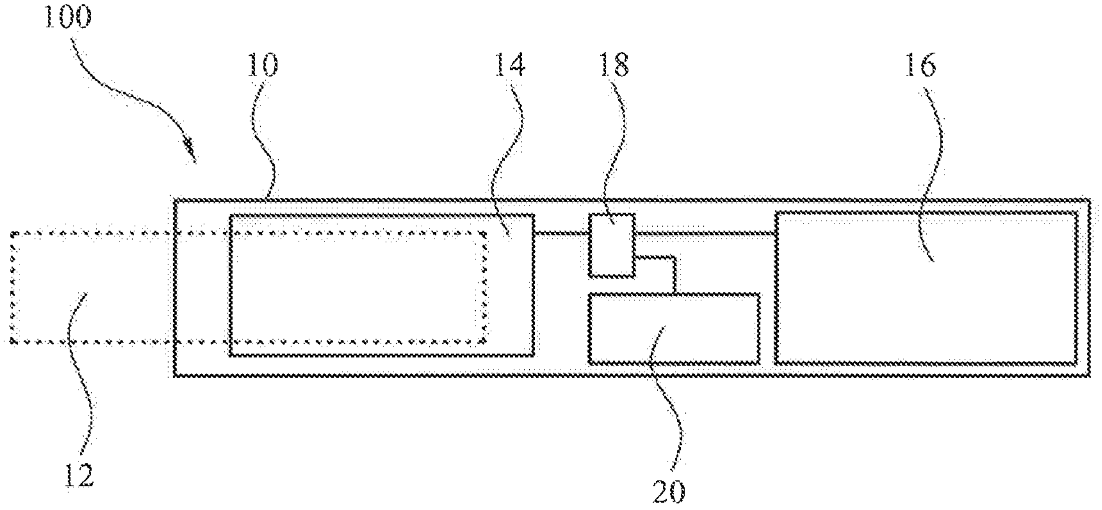
FIG. 1 is a schematic diagram of an aerosol generating device.

In FIG. 1, the components of an embodiment of an electrically heated aerosol-generating system 100 are shown in a simplified manner. Particularly, the elements of the electrically heated aerosol-generating system 100 are not drawn to scale in FIG. 1. Elements that are not relevant for the understanding of this embodiment have been omitted to simplify FIG. 1.

The electrically heated aerosol generating system 100 comprises an aerosol-generating device having a housing 10 and an aerosol-forming article 12, for example a tobacco stick. The aerosol-forming article 12 includes an aerosol-forming substrate that is pushed inside the housing 10 to come into thermal proximity with heater 14. The aerosol-forming substrate will release a range of volatile compounds at different temperatures. By controlling the maximum operation temperature of the electrically heated aerosol generating system 100 to be below the selective release of undesirable compounds may be controlled by preventing the release of select volatile compounds.

Within the housing 10 there is an electrical energy supply 16, for example a rechargeable lithium ion battery. A controller 18 is connected to the heater 14, the electrical energy supply 16, and a user interface 20, for example a button or display. The controller 18 controls the power supplied to the heater 14 in order to regulate its temperature. Typically the aerosol-forming substrate is heated to a temperature of between 250 and 450 degrees centigrade.

Figure 2:
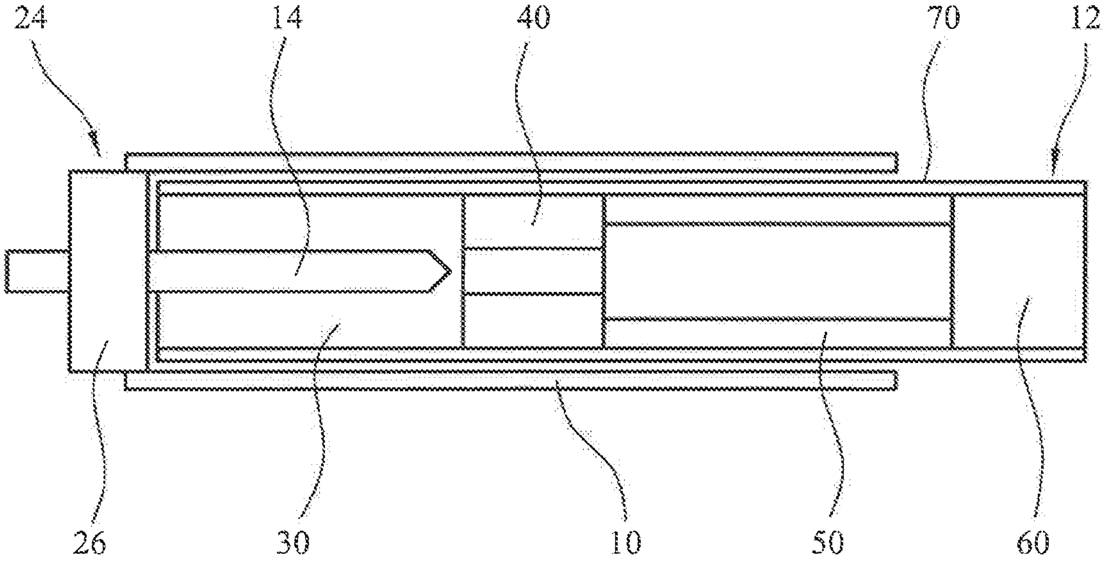
FIG. 2 is a schematic cross-section of a front end of an aerosol-generating device of the type shown in FIG. 1, with the heater inserted into a smoking article.

FIG. 2 is a schematic cross-section of a front end of an aerosol-generating device of the type shown in FIG. 1, with the heater 14 inserted into the aerosol-forming article 12, which in this embodiment is a smoking article, The aerosol-generating device is illustrated in engagement with the aerosol-generating article 12 for consumption of the aerosol-generating article 12 by a user, The housing 10 of aerosol-generating device defines a cavity, open at the proximal end (or mouth end), for receiving an aerosol-generating article 12 for consumption. The distal end of the cavity is spanned by a heating assembly 24 comprising a heater 14 and a heater mount 26. The heater 14 is retained by the heater mount 26 such that an active heating area of the heater is located within the cavity. The active heating area of the heater 14 is positioned within a distal end of the aerosol-generating article 12 when the aerosol-generating article 12 is fully received within the cavity.

The heater 14 is shaped in the form of a blade terminating in a point. That is, the heater has a length dimension that is greater than its width dimension, which is greater than its thickness dimension. First and second faces of the heater are defined by the width and length of the heater.

An exemplary aerosol-forming article, as illustrated in FIG. 2, can be described as follows. The aerosol-generating article 12 comprises four elements: an aerosol-forming substrate 30, a support element, such as a hollow tube 40, a transfer section 50, and a mouthpiece filter 60. These four elements are arranged sequentially and in coaxial alignment and are assembled by a cigarette paper 70 to form a rod. When assembled, the aerosol-forming article is 45 millimetres long and has a diameter of 7 millimetres.

The aerosol-forming substrate comprises a bundle of crimped cast-leaf tobacco wrapped in a filter paper (not shown) to form a plug. The cast-leaf tobacco includes one or more aerosol formers, such as glycerine.

The hollow tube 40 is located immediately adjacent the aerosol-forming substrate 30 and is formed from a tube of cellulose acetate. The tube 40 defines an aperture having a diameter of 3 millimetres. One function of the hollow tube 40 is to locate the aerosol-forming substrate 30 towards the distal end 23 of the rod 21 so that it can be contacted with the heater. The hollow tube 40 acts to prevent the aerosol-generating substrate 30 from being forced along the rod towards the mouthpiece when a heater is inserted into the aerosol-forming substrate 30.

The transfer section 50 comprises a thin-walled tube of 18 millimetres in length. The transfer section 50 allows volatile substances released from the aerosol-forming substrate 30 to pass along the article towards the mouthpiece filter 60. The volatile substances may cool within the transfer section to form an aerosol, The mouthpiece filter 60 is a conventional mouthpiece filter formed from cellulose acetate, and having a length of approximately 7.5 millimetres.

The four elements identified above are assembled by being tightly wrapped within a cigarette paper 70. The paper in this specific embodiment is a standard cigarette paper having standard properties or classification. The paper in this specific embodiment is a conventional cigarette paper. The interface between the paper and each of the elements locates the elements and defines the aerosol-forming article 12.

As the aerosol-generating article 12 is pushed into the cavity, the tapered point of the heater engages with the aerosol-forming substrate 30. By applying a force to the aerosol-forming article, the heater penetrates into the aerosol-forming substrate 30. When the aerosol-forming article 12 is properly engaged with the aerosol-generating device, the heater 14 is inserted into the aerosol-forming substrate 30. When the heater is actuated, the aerosol-forming substrate 30 is warmed and volatile substances are generated or evolved, As a user draws on the mouthpiece filter 60, air is drawn into the aerosol-forming article and the volatile substances condense to form an inhalable aerosol, This aerosol passes through the mouthpiece filter 60 of the aerosol-forming article and into the user's mouth.

Figure 3:
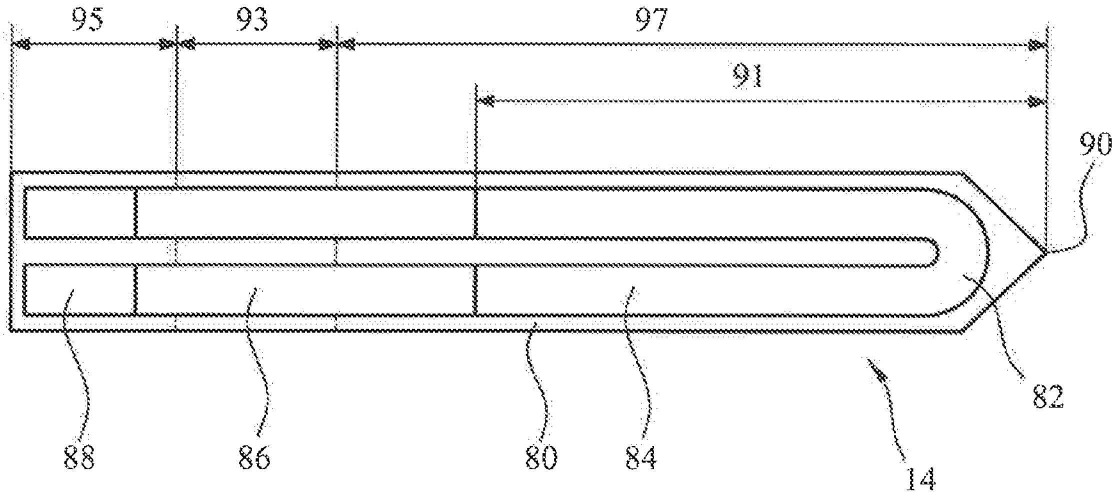
FIG. 3 is a schematic illustration of a heater in accordance with the present invention.

FIG. 3 illustrates a heater element 14 of the type shown in FIG. 2 in greater detail. The heater 14 comprises an electrically insulating heater substrate 80, which defines the shape of the heating element 14. The heater substrate 80 is formed from an electrically insulating material, which may be, for example, alumina ($Al_2O_3$) or stabilized zirconia ($ZrO_2$). It will be apparent to one of ordinary skill in the art that the electrically insulating material may be any suitable electrically insulating material and that many ceramic materials are suitable for use as the electrically insulating substrate. The heater substrate 80 is substantially blade-shaped. That is, the heater substrate has a length that in use extends along the longitudinal axis of an aerosol-forming article engaged with the heater, a width and a thickness. The width is greater than the thickness. The heater substrate 80 terminates in a point or spike 90 for penetrating an aerosol-forming substrate 30.

Figure 4:
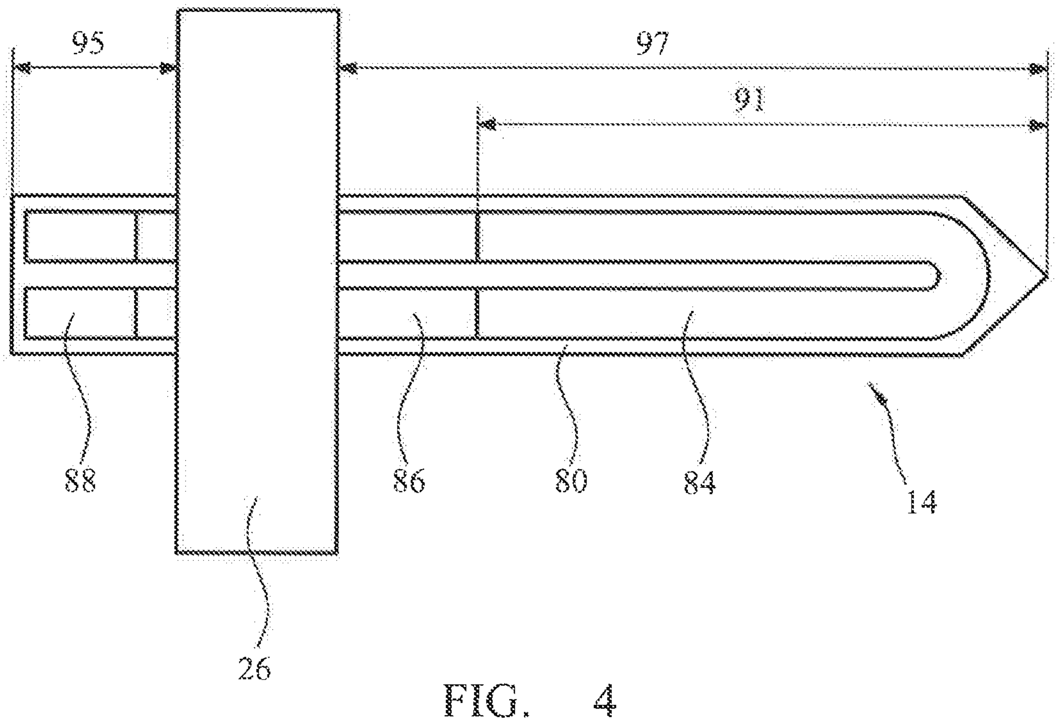
FIG. 4 shows the heater of FIG. 3 with a heater mount assembled to it.

A heating element 82 formed from electrically conductive material is deposited on a planar surface of the heater substrate 80 using evaporation or any other suitable technique. The heating element is formed in three distinct portions. A first portion 84 is formed from platinum. The first portion is positioned in the active heating area 91. This is the area of the heater which reaches the maximum temperature and provides heat to an aerosol-forming substrate in use. The first portion is U-shaped or in the shape of a hairpin. A second portion 86 is formed from gold. The second portion comprises two parallel tracks, each connected to an end of the first portion 84, The second portion spans the holding area 93 of the heater, which is the area of the heater that is in contact with the heater mount 26, as shown in FIG. 4. A third portion 88 is formed from silver. The third portion is positioned in the connecting area 95 and provides bonding pads to which external wires can be fixed using solder paste or other bonding techniques, The third portion comprises two parallel pads, each connected to an end of one of the parallel tracks of the second portion 86, opposite to the first portion 84. The third portion 88 is positioned on an opposite side of the holding area 93 to the first portion.

The shape, thickness and width of the first, second and third portions may be chosen to provide the desired resistance and temperature distribution in use. However, the first portion has a significantly greater electrical resistance per unit length than the second and third portions and, as a result, when an electrical current passes through the heating element 82, it is the first portion that generates the most heat and so reaches the highest temperature. The second and third portions are configured to have a very low electrical resistance and so provide very little Joule heating. The total electrical resistance of the heating element is about 0.80 Ohms at 0° C., rising to about 2 Ohms when the active heating area 91 reaches 400° C. The battery voltage of the lithium ion battery is around 3.7 Volts so that the typical peak current supplied by the power supply (at 0° C.) is around 4. 6A.

Platinum has a positive temperature coefficient of resistance and so the electrical resistance of the first portion 84 increases with increasing temperature. Gold and silver have lower temperature coefficients of resistance, and the second and third portions will not experience as great a temperature rise as the first portion. This means that changes in resistance of the second and third portions will be small compared to changes in the resistance of the first portion. As a result, the resistance of the heating element 82 can be used to provide a measure of the temperature of the first portion 84 of the heating element, which is the temperature of the portion of the heater in contact with the aerosol-forming substrate. An arrangement for using a resistive element as both a heater and a temperature sensor is described in EP2110033 B1.

FIG. 4 shows the heater 14 assembled to a heater mount 26 to form a heating assembly. The heater mount 26 is formed from polyether ether ketone (PEEK) and is injection moulded around the heater to surround the holding area 93. The heater substrate 80 may be formed with notches or protrusion in the holding area to ensure a strong fixing between the heater mount and the heater. In this embodiment the heater mount 26 has a circular cross-section to engage a circular housing 10 of the aerosol-generating device, However, the heater mount may be moulded to have any desired shape and any desired engagement features for engaging with other components of the aerosol-generating device.

Figure 5:
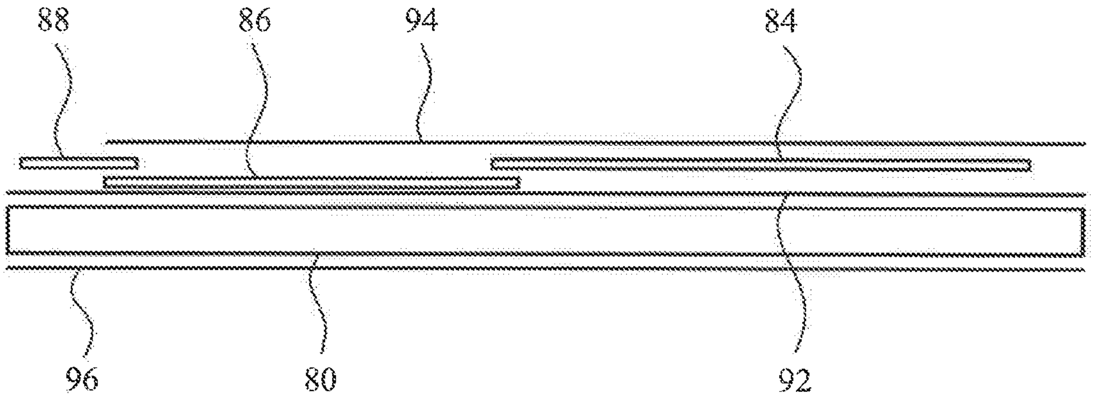
FIG. 5 is a cross-section of the heater of FIG. 3.

FIG. 5 is schematic-cross section of the heater of FIG. 3. FIG. 5 illustrates that there is overlap between the first, second and third portions of the heating element. The construction of the heater can be described as follows. The heater substrate 80 is covered with layers of glass 92, 96, on both the first and second surfaces. This protects the substrate and improves the distribution of heat across the surface of the heater in the active heating area. The gold tracks forming the second portion 86 of the heating element are then deposited onto the glass layer 92. The platinum track, forming the first portion 84 of the heating element, is then deposited on the glass layer 92, in an overlapping relation with the gold tracks to ensure a low electrical resistance contact between the first and second portions. The silver connection pads forming the third portion 88 of the heating element are also deposited on the glass layer 92, in an overlapping relation with the gold tracks to ensure a low electrical resistance contact between the third and second portions. Finally an overlying glass layer 94 is formed, covering the heating element 82 and protecting the heating element from corrosion. The heater mount can then be moulded around the heater.

The heater is configured so that the active heating area, corresponding to the first portion of the heating element, is spaced from the heater mount, The area of the heater that extends into the cavity of the aerosol-generating device is referred to as the insertion area 97. The part of the second portion 86 of the heating element that extends into the insertion area 97 provides an energy transfer area.

Figure 6:
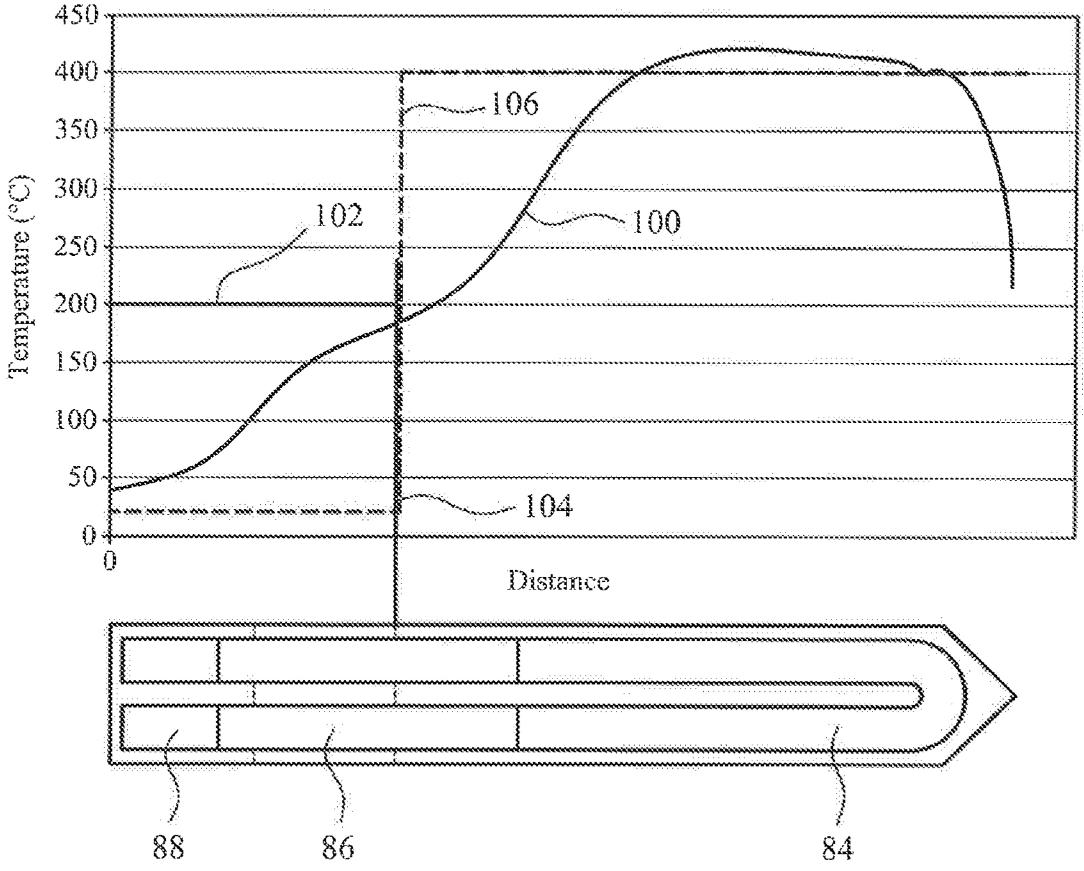
FIG. 6 is an illustration of the temperature profile along a heater of the type shown in FIG. 3.

FIG. 6 is plot 100 showing the temperature of the heater as a function of distance along the length of the heater during operation of the heater illustrated in FIG. 3. The heater is shown below the plot such that the plot of temperature is aligned with the heater. Ideally the heater is hot in the insertion area 97 and cool in the holding area 93 and connection area 95. An ideal temperature profile is shown by dotted line 106. In reality the temperature profile can never be so sharply stepped. It can be seen from the actual temperature plot 100 that the heater is hottest in the active heating area, where the first portion of the heating element is positioned. The peak temperature is around 420° C. during aerosol generation, In the energy transfer area between the active heating area and the holding area, the temperature drops rapidly. In this embodiment, at the heater mount, it is desirable that the temperature of the heater is lower than 200° C., as shown by line 102. The maximum temperature allowable at the heater mount will depend on the material used to form the heater mount. The position of the closest part of heater mount to the active heating area is shown as line 104. The heater is configured to ensure that the temperature at the heater mount 26 is less that 200° C. when the active area of the heater reaches its maximum temperature in use. In the example shown in FIG. 6 the distance between the platinum portion of the heating element and the heater mount is 3 mm. This is sufficient a distance to ensure the required temperature drop. Gold is chosen as the material for the second portion of the heating element because, in addition to a high electrical conductivity, gold has a relatively low thermal conductivity, ensuring a rapid temperature drop between the active heating area and the holding area. An additional temperature drop to approximately 50° C. is further desirable in at least a portion of connecting area 95 in including third portion 88 of the heating element. In particular, it is desirable to minimize the temperature of element 14 closest to controller 18, the electrical energy supply 16, and a user interface 20. For example, such temperature minimization will reduce or eliminate the need to correct for thermal induced variation in the electronic chips and/or systems comprising controller 18, supply 16, and interface 20.

The exemplary embodiments described above illustrate but are not limiting. In view of the above discussed exemplary embodiments, other embodiments consistent with the above exemplary embodiments will now be apparent to one of ordinary skill in the art.

We claim:

1. An aerosol-generating smoking device, comprising:

a heater configured to heat an aerosol-forming substrate, the heater comprising an electrically resistive heating element and a heater substrate, wherein the electrically resistive heating element comprises a first portion formed from a first material and a second portion formed from a second material different than the first material, configured such that, when an electrical current is passed through the electrically resistive heating element, the first portion is heated to a higher temperature than the second portion as a result of the electrical current, and wherein the heater substrate is electrically insulating and defines the shape of the heater.

2. The aerosol-generating smoking device according to claim 1, further comprising a protective layer covering the electrically resistive beating element.

3. The aerosol-generating smoking device according to claim 2, wherein the protective layer is formed from glass.

4. The aerosol-generating smoking device according to claim 1, wherein the second portion of the electrically resistive heating element comprises two sections, each of the two sections being separately connected to the first portion of the electrically resistive heating element so as to define an electrical flow path from one of the two sections of the second portion to the first portion and to another one of the two sections of the second portion.

5. The aerosol-generating smoking device according to claim 4, wherein the electrically resistive heating element comprises a third portion configured for electrical connection to a power supply, and wherein the third portion is disposed on an opposite side of a heater mount coupled to the heater than the first portion of the electrically resistive heating element.

6. The aerosol-generating smoking device according to claim 5, wherein the third portion is formed from a different material than the first portion and the second portion.

7. The aerosol-generating smoking device according to claim 1, wherein the first portion of the electrically resistive heating element is spaced from a heater mount coupled to the heater.

8. The aerosol-generating smoking device according to claim 1, wherein under normal operating conditions, when the first portion of the electrically resistive heating element is at a temperature of between 300 degrees centigrade and 550 degrees centigrade, at points of contact with a heater mount the second portion is at a temperature of less than 200 degrees centigrade.

9. The aerosol-generating smoking device according to claim 1, wherein the first portion has a greater temperature coefficient of resistance than that of the second portion.

10. The aerosol-generating smoking device according to claim 1, wherein if a maximum temperature of the first portion is $T_1$, an ambient temperature is $T_0$, and a temperature of the second portion of the electrically resistive heating element in contact with a heater mount is $T_2$, then: $(T_1-T_0)/(T_2-T_0)>2$.

11. The aerosol-generating smoking device according to claim 1, further comprising a heater mount coupled to the heater.

12. The aerosol-generating smoking device according to claim 11, further comprising: a housing, wherein the heater mount is coupled to the housing; an electrical power supply connected to the electrically resistive heating element; and a control element configured to control a supply of power from the electrical power supply to the electrically resistive heating element.

13. The aerosol-generating smoking device according to claim 12, wherein the housing defines a cavity surrounding the first portion of the electrically resistive heating element, the cavity configured to receive an aerosol-forming article containing an aerosol- forming substrate.

14. The aerosol-generating smoking device according to claim 12, wherein the aerosol-generating smoking device is a handheld smoking device.

15. The aerosol-generating smoking device according to claim 1, wherein the heater substrate provides a mechanically stable support for the electrically resistive heating element.

* * * * *